United States Patent
Ananthanarayanan et al.

(10) Patent No.: US 6,791,051 B2
(45) Date of Patent: Sep. 14, 2004

(54) METHOD FOR METALLURGICALLY ATTACHING A TUBE TO A MEMBER

(75) Inventors: Venkatasubramanian Ananthanarayanan, Beavercreek, OH (US); Dharmendra M. Ramachandra, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/225,789

(22) Filed: Aug. 22, 2002

(65) Prior Publication Data

US 2004/0035831 A1 Feb. 26, 2004

(51) Int. Cl.[7] .............................................. B23K 11/00
(52) U.S. Cl. .................................... 219/59.1; 219/78.16
(58) Field of Search ............................ 219/59.1, 61.11, 219/78.01, 78.16, 101, 102, 104, 117.1

(56) References Cited

U.S. PATENT DOCUMENTS

| | | | | |
|---|---|---|---|---|
| 2,824,212 A | * | 2/1958 | Roberts | 219/91.23 |
| 4,648,811 A | * | 3/1987 | Tahata et al. | 219/117.1 |
| 4,676,427 A | * | 6/1987 | Constance | 228/189 |
| 4,677,271 A | * | 6/1987 | Opprecht | 219/93 |
| 6,089,617 A | * | 7/2000 | Craig et al. | 219/93 |
| 6,287,513 B1 | | 9/2001 | Grady et al. | 419/37 |
| 6,539,837 B2 | | 4/2003 | Fanelli et al. | 92/169.3 |
| 6,586,110 B1 | | 7/2003 | Obeshaw | 428/593 |
| 6,615,488 B2 | | 9/2003 | Anders et al. | 29/890.053 |
| 6,623,048 B2 | | 9/2003 | Castel et al. | 285/382 |

FOREIGN PATENT DOCUMENTS

DE 28 06 287 A1 * 8/1979 ............ B23K/31/06

* cited by examiner

*Primary Examiner*—Kiley Stoner
*Assistant Examiner*—Kevin P. Kerns
(74) *Attorney, Agent, or Firm*—Michael D. Smith

(57) ABSTRACT

A method for metallurgically attaching a tube to a member. A member having a wall is obtained. The wall includes opposing first and second sides and includes a partial extrusion extending above the first side. The partial extrusion has a through hole. A tube having an end portion is obtained. The tube and the member are positioned with the end portion contacting the second side of the wall proximate the partial extrusion. A resistance welding current path is created through the tube and the member proximate the end portion and the partial extrusion, and the end portion is relatively moved into and deformingly against the partial extrusion creating a weld zone which includes at least some of the end portion and at least some of the partial extrusion.

22 Claims, 4 Drawing Sheets

METHOD FOR METALLURGICALLY ATTACHING A TUBE TO A MEMBER

TECHNICAL FIELD

The present invention relates generally to metallurgy, and more particularly to a method for metallurgically attaching a tube to a member.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for metallurgically attaching together two parts also include a known method for metallurgically attaching together an inlet/outlet tube to a vehicle fuel tank cover. In the known method, a sheet-metal plate of low-carbon steel is obtained for the vehicle fuel tank cover, and a low-carbon steel tube is obtained for the inlet/outlet tube. A through hole is punched in the plate creating a full extrusion which surrounds the through hole and which projects perpendicularly away from the plate. Forming operations on the tube create a transversely-projecting annular rim on the tube. The tube is sized so that it is insertable in the through hole so as to longitudinally extend beyond both longitudinal ends of the through hole. The tube is inserted in the through hole so that the rim of the tube is seated on the plate and the full extrusion of the plate projects away from the rim. Then, the tube and the plate are brazed together near the through hole.

For the brazing operation, a furnace is required having specific temperatures and temperature gradients. The furnace must be kept with a controlled reducing atmosphere to remove the oxides from the plate and the tube before the brazing is actually performed. Also, a copper ring must be used for the filler material to perform the brazing. A ceramic chain pulley mechanism is required to move the parts through the furnace.

What is needed is a less expensive method for metallurgically attaching a tube to a member, such as metallurgically attaching an inlet/outlet tube to a vehicle fuel tank cover.

SUMMARY OF THE INVENTION

A first method of the invention is for metallurgically attaching a tube to a member. The first method includes steps a) through d). Step a) includes obtaining a member having a wall, wherein the wall includes opposing first and second sides and includes a partial extrusion extending above the first side, and wherein the partial extrusion has a through hole. Step b) includes obtaining a tube having an end portion. Step c) includes, after steps a) and b), positioning the tube and the member with the end portion contacting the second side of the wall near the partial extrusion. Step d) includes, after step c), creating a resistance welding current path through the tube and the member near the end portion and the partial extrusion and relatively moving the end portion into and deformingly against the partial extrusion creating a weld zone which includes at least some of the end portion and at least some of the partial extrusion. In one application of the first method the wall is a wall of a plate, and in a different application of the first method the wall is a wall of a tubular member.

A second method of the invention is for metallurgically attaching a tube to a member. The second method includes steps a) through d). Step a) includes obtaining a member having a wall, wherein the wall includes opposing first and second sides and includes a partial extrusion extending above the first side, wherein the partial extrusion has a through hole and a longitudinal axis aligned substantially perpendicular to the wall, and wherein the through hole is substantially coaxially aligned with the longitudinal axis. Step b) includes obtaining a tube having a tapered end portion matching the angle of the partial extrusion. Step c) includes, after steps a) and b), positioning the tube and the member with the tube aligned substantially coaxially with the longitudinal axis and with the tapered end portion contacting the second side of the wall substantially at the partial extrusion. Step d) includes, after step c), creating an annular resistance welding current path through the tube and the member at the tapered end portion and near the partial extrusion and relatively moving the tapered end portion into and deformingly against the partial extrusion creating an annular weld zone which includes at least some of the tapered end portion and at least some of the partial extrusion.

A third method of the invention is for metallurgically attaching a tube to a member. The second method includes steps a) through d). Step a) includes obtaining a member having a wall, wherein the wall includes opposing first and second sides and includes a partial extrusion extending above the first side, wherein the partial extrusion has a through hole and a longitudinal axis aligned substantially perpendicular to the wall, and wherein the through hole is substantially coaxially aligned with the longitudinal axis. Step b) includes obtaining a tube having flanged end portion. Step c) includes, after steps a) and b), positioning the tube and the member with the tube aligned substantially coaxially with the longitudinal axis and with the flanged end portion contacting the second side of the wall substantially at the partial extrusion. Step d) includes, after step c), creating an annular resistance welding current path through the tube and the member at the flanged end portion and near the partial extrusion and relatively moving the flanged end portion into and deformingly against the partial extrusion creating an annular weld zone which includes at least some of the flanged end portion and at least some of the partial extrusion.

Several benefits and advantages are derived from one or more of the methods of the invention. Resistance welding is less expensive than brazing. In the application for metallurgically attaching together a vehicle fuel tank cover and an inlet/outlet tube, instead of costing about one dollar per attachment it is expected to cost only a few cents per attachment.

DESCRIPTION OF THE PREFERRED EMBODIMENTS

Figure 1:
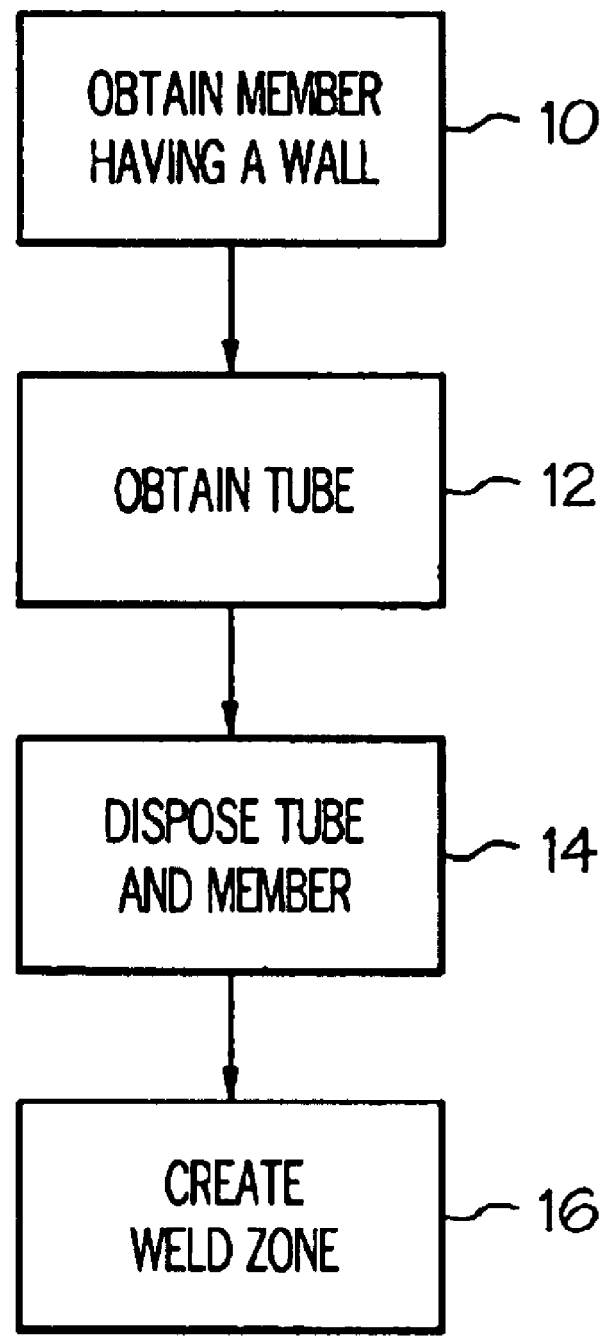
FIG. 1 is a block diagram of the first method of the invention for metallurgically attaching a tube to a member.

A first method of the invention is for metallurgically attaching a tube to a member and is shown in block diagram form in FIG. 1. The first method includes steps a) through d). Step a) is labeled as "Obtain Member Having A Wall" in block 10 of FIG. 1. Step a) includes obtaining a member having a wall, wherein the wall includes opposing first and second sides and includes a partial extrusion extending above the first side, and wherein the partial extrusion has a through hole. A "partial extrusion having a through hole" of a wall is a portion of a wall which is raised above the adjoining surface of the wall, by whatever means, and which surrounds a through hole in the wall, wherein the raised wall portion is raised to less than a perpendicular position from its unraised state. This contrasts with a "full extrusion having a through hole" of a wall wherein the raised portion of the wall is raised to an angle substantially equal to ninety degrees from its unraised state. Step b) is labeled in block 12 of FIG. 1 as "Obtain Tube". Step b) includes obtaining a tube having an end portion. Step c) is labeled in block 14 of FIG. 1 as "Dispose Tube and Member". Step c) includes, after steps a) and b), disposing the tube and the member with the end portion contacting the second side of the wall proximate the partial extrusion. The term "proximate" includes, without limitation, the term "at". Step d) is labeled as "Create Weld Zone" in block 16 of FIG. 1. Step d) includes, after step c), creating a resistance welding current path through the tube and the member proximate the end portion and the partial extrusion and relatively moving the end portion into and deformingly against the partial extrusion creating a weld zone which includes at least some of the end portion and at least some of the partial extrusion. By "relatively moving" is meant moving the end portion with the partial extrusion stationary or moving the partial extrusion with the end portion stationary or moving both the end portion and the partial extrusion, as is understood by the artisan.

In one application of the first method, such relative movement squeezes out surface contaminants from between the end portion and the partial extrusion and such relative movement levels the hills and valleys between the contacting surfaces of the end portion and the partial extrusion to bring surface atoms of the end portion within atomic bonding distances with surface atoms of the partial extrusion. In one implementation of the first method, step d) does not melt any of the end portion and does not melt any of the partial extrusion. In another implementation, step d) melts at least some of the end portion or at least some of the partial extrusion or melts at least some of the end portion and at least some of the partial extrusion.

In one example of the first method, the wall is a wall of a plate. In another example, the wall is a wall of a tubular member. In one variation, the tubular member is a substantially right-circular cylindrical tubular member. In another variation, the tubular member has a cross section which has a substantially rectangular shape, wherein the cutting plane for the cross section is perpendicular to the longitudinal axis of the tubular member. Other examples and variations of the wall are left to the artisan.

In one enablement of the first method, the partial extrusion has a longitudinal axis aligned substantially perpendicular to the wall, and the through hole is substantially coaxially aligned with the longitudinal axis of the extrusion. In one variation, the through hole has a cross section which is a substantially circular or a substantially rectangular cross section, wherein the cutting plane for the cross section is perpendicular to the longitudinal axis of the tubular member. Other enablements and variations of the partial extrusion and the through hole are left to the artisan.

In one embodiment of the first method, the tube is a substantially right-circular cylindrical tube. In another embodiment, the tube has a cross section which has a substantially rectangular shape, wherein the cutting plane for the cross section is perpendicular to the longitudinal axis of the tube. Other examples and variations of the tube are left to the artisan.

In one application of the first method, the end portion is a tapered end portion. For purposes of describing the first (or any) method, a tapered end portion of a tube is a tube end portion which extends inward at an angle less than substantially ninety degrees. In another application, the end portion is a flanged end portion. For purposes of describing the first (or any) method, a flanged end portion of a tube is a tube end portion which extends outward at an angle equal to substantially ninety degrees. In a different application, the end portion is a substantially straight end portion which is substantially parallel to the longitudinal axis of the tube. Other shapes of the end portion are left to the artisan.

In one execution of the first method, step c) includes aligning the tube substantially perpendicular to the wall. In the same or another execution, step d) creates an annular (or non-annular) weld zone. In the same or a different execution, step d) uses a resistance-welding first electrode contacting the first side of the wall before and substantially at the onset of the partial extrusion and a resistance-welding second electrode contacting the tube, and step d) relatively moves the first and second electrodes to relatively move the end portion into and deformingly against the partial extrusion. In one variation, the second electrode is disposed inside the tube. In another variation, the second electrode is disposed outside the tube. In one modification of either variation, a non-electrode support is disposed inside or outside the tube, and in one example extends around the other end of the tube, to radially support the tube and/or to axially support or push the tube during step d).

Figure 2:
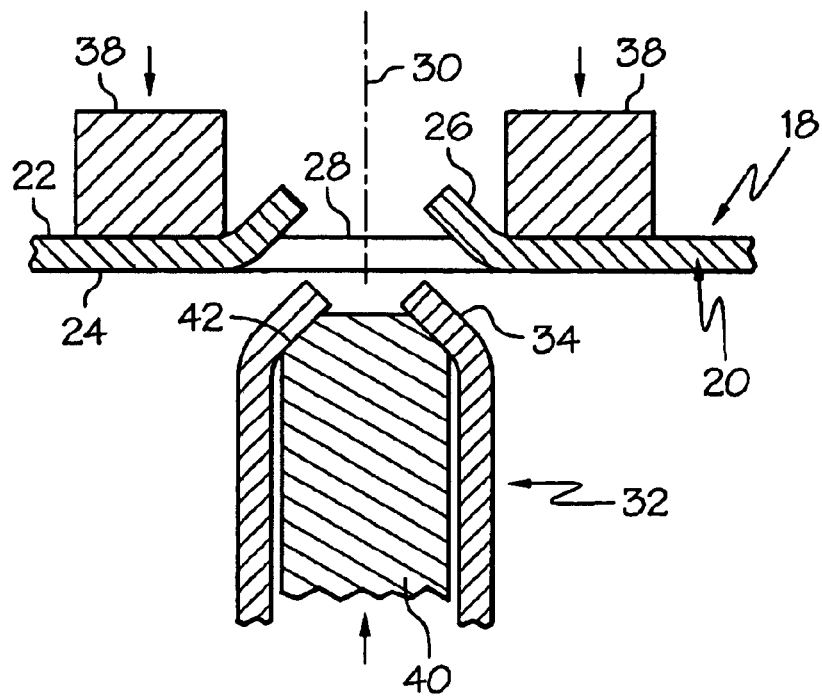
FIG. 2 is a schematic, side cross-sectional view of a first embodiment of a tube having a tapered end portion and of a member used in the second method of the invention showing the tube aligned with the member.
Figure 3:
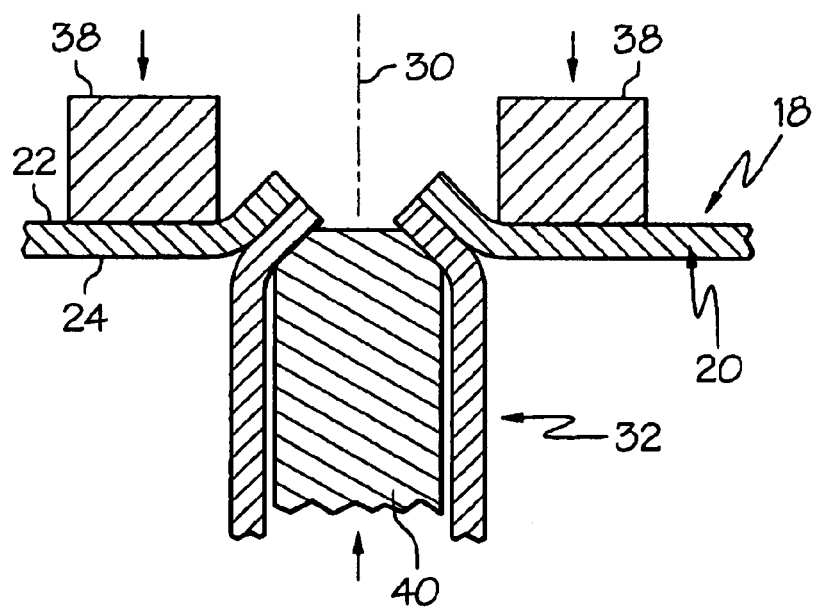
FIG. 3 is a view, as in FIG. 2, but showing a later positioning of the tube and the member.
Figure 4:
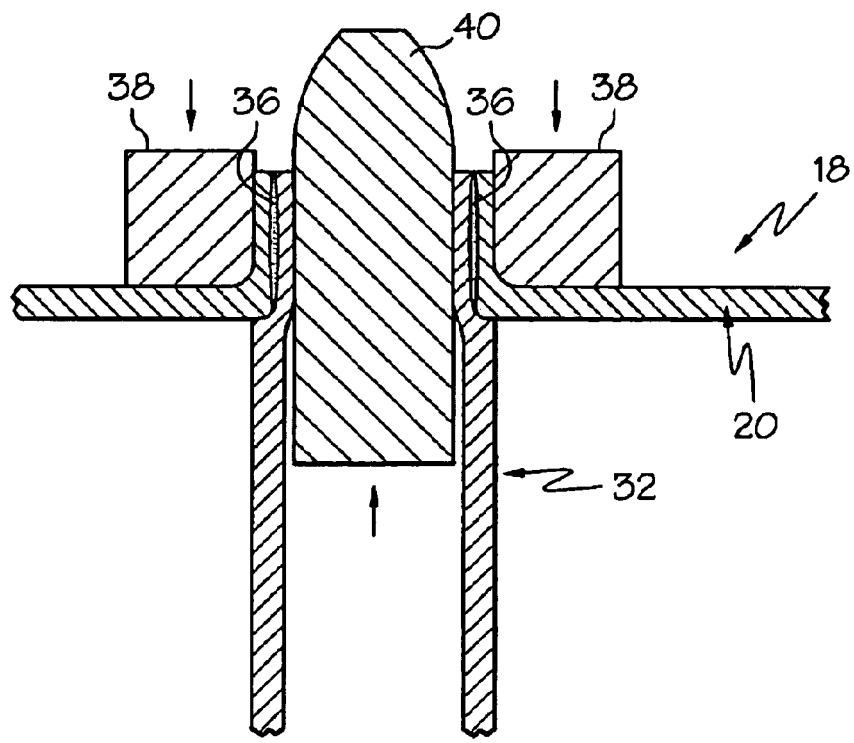
FIG. 4 is a view, as in FIG. 3, but showing a still later relative movement of the tapered end portion of the tube into and deformingly against the partial extrusion of the member.
Figure 5:
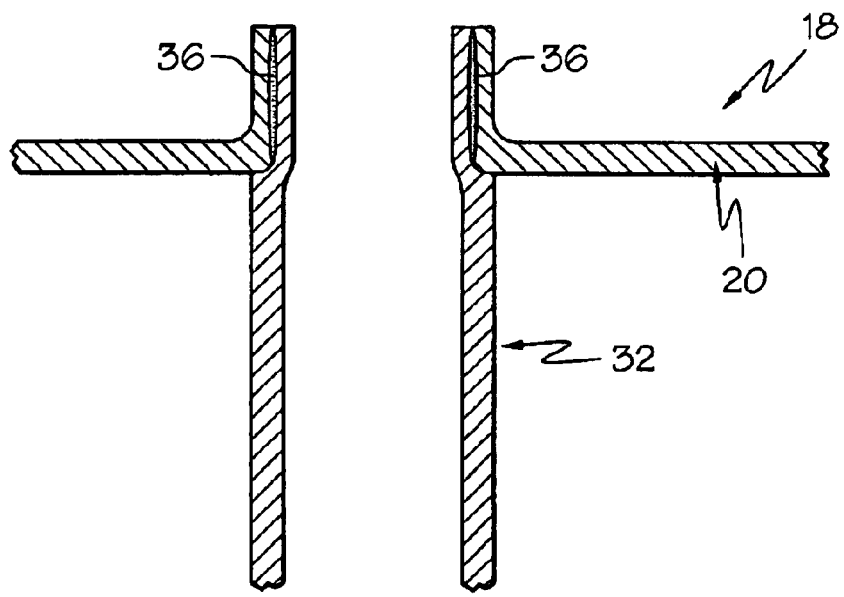
FIG. 5 is a view, as in FIG. 4, but showing the tube metallurgically attached to the member with the welding electrodes removed.

Referring to FIGS. 2-5, wherein like numerals represent like elements throughout, a second method of the invention is for metallurgically attaching a tube to a member and includes steps a) through d). Step a) includes obtaining a member 18 having a wall 20. The wall 20 includes opposing first and second sides 22 and 24 and includes a partial extrusion 26 extending above the first side 22. The partial extrusion 26 has a through hole 28 and has a longitudinal axis 30 aligned substantially perpendicular to the wall 20. The through hole 28 is substantially coaxially aligned with the longitudinal axis 30. Step b) includes obtaining a tube 32 having a tapered end portion 34 matching the angle of the partial extrusion 26 (as shown in FIG. 2). Step c) includes, after steps a) and b), disposing the tube 32 and the member 18 with the tube 32 aligned substantially coaxially with the longitudinal axis 30 and with the tapered end portion 34 contacting the second side 24 of the wall 20 substantially at the partial extrusion 26 (as shown in FIG. 3). Step d) includes, after step c), creating an annular resistance welding current path through the tube 32 and the member 18 at the tapered end portion 34 and proximate the partial extrusion 26 and relatively moving the tapered end portion 34 into and deformingly against the partial extrusion 26 (as shown in FIG. 4) creating an annular weld zone 36 (as shown in FIGS. 4 and 5) which includes at least some of the tapered end portion 34 and at least some of the partial extrusion 26.

In one example of the second method, step c) uses an annular resistance-welding first electrode 38 contacting the first side 22 of the wall 20 before and substantially at the onset of the partial extrusion 26 and uses a cylindrical resistance-welding second electrode 40 disposed inside the tube 32 and contacting the tapered end portion 34. In one variation, the second electrode 40 has a tapered tip 42 which matches the angle of, and which contacts, the tapered end portion 34 of the tube 32. In one modification, step d) relatively moves the second electrode 40 substantially parallel to the longitudinal axis 30 and inside the first electrode 38 (as shown in FIG. 4) to relatively move the tapered end portion 34 into and deformingly against the partial extrusion 26. Unnumbered arrows in FIGS. 2–5 indicate the direction of relative movement of the electrodes. It is noted that the optional implementations, examples, enablements, etc. of the first method are equally applicable to the second method, other than those having to do with a different shaped end portion or a second electrode disposed outside the tube, as can be appreciated by the artisan.

Figure 6:
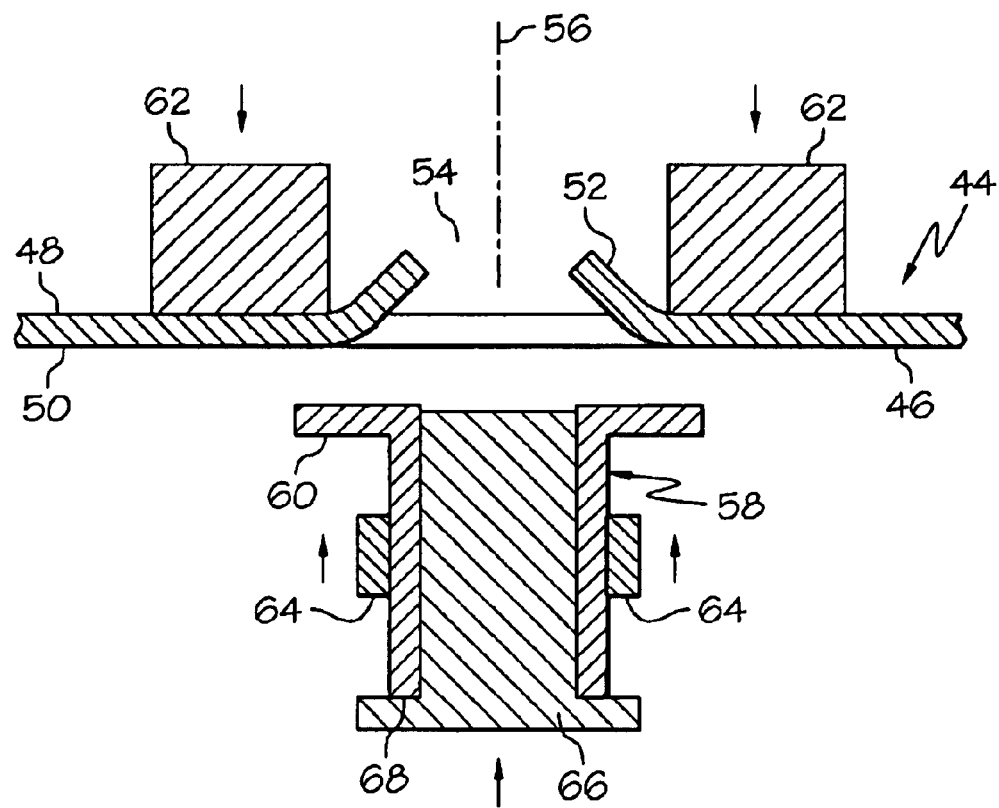
FIG. 6 is a schematic, side cross-sectional view of a second embodiment of a tube having a flanged end portion and of a member used in the third method of the invention showing the tube aligned with the member.

Referring to FIG. 6, a third method of the invention is for metallurgically attaching a tube to a member and includes steps a) through d). Step a) includes obtaining a member 44 having a wall 46. The wall 46 includes opposing first and second sides 48 and 50 and has a partial extrusion 52 extending above the first side 48. The partial extrusion has a through hole 54 and a has longitudinal axis 56 aligned substantially perpendicular to the wall 46. The through hole 54 is substantially coaxially aligned with the longitudinal axis 56. Step b) includes obtaining a tube 58 having a flanged end portion 60 (as shown in FIG. 6). Step c) includes, after steps a) and b), disposing the tube 58 and the member 44 with the tube 58 aligned substantially coaxially with the longitudinal axis 56 and with the flanged end portion 60 contacting the second side 50 of the wall 46 substantially at the partial extrusion 52. Step d) includes, after step c), creating an annular resistance welding current path through the tube 58 and the member 44 at the flanged end portion 60 and proximate the partial extrusion 52 and relatively moving the flanged end portion 60 into and deformingly against the partial extrusion 52 creating an annular weld zone which includes at least some of the flanged end portion 60 and at least some of the partial extrusion 52.

In one example of the third method, step d) uses an annular resistance-welding first electrode 62 contacting the first side 48 of the wall 46 before and substantially at the onset of the partial extrusion 52 and uses an annular resistance-welding second electrode 64 contacting the outside of the tube 58 proximate the flanged end portion 60. A non-electrode support 66 is disposed inside the tube and extends over the other end 68 of the tube 58. Unnumbered arrows in FIG. 6 indicate the direction of relative movement of the electrodes and support. In one variation, not shown, the second electrode is a cylindrical resistance-welding second electrode disposed inside the tube and extending over the other end of the tube, and the non-electrode support is an annular support disposed outside the tube. It is noted that the optional implementations, examples, enablements, etc. of the first method are equally applicable to the third method, other than those having to do with a different shaped end portion, as can be appreciated by the artisan.

In one construction for the first, second, and/or third method, the member is a sheet metal plate comprising low carbon steel such as AISI 1008 to 1010 having a thickness of generally 2 millimeters, the base of the partial extrusion has a diameter of generally 10 millimeters, and the through hole has a diameter of generally 2 millimeters. In this construction, the tube comprises low carbon steel such as AISI 1008 to 1010 having an outside diameter of generally 6 millimeters and a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes/support. The first, second, and/or third methods are not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and dimensions of the tube and the member, etc. are within the ordinary level of skill of the artisan.

In one design for the first, second, and/or third method, the previously-discussed electrodes are installed in "T"-shaped electrode holders of a resistance welding machine (not shown). In one example, not shown, each electrode is formed from two sections which are brought together around the corresponding one of the tube and the member and engage that tube or member. The electrode sections have surfaces generally corresponding to the shape of the engaged portion of that tube or member. The electrode sections are attached together before installing the electrode in the corresponding upper or lower one of the "T"-shaped electrode holders of the resistance welding machine.

Several benefits and advantages are derived from one or more of the methods of the invention. Resistance welding is less expensive than brazing. In the application for metallurgically attaching together a vehicle fuel tank cover and an inlet/outlet tube, instead of costing about one dollar per attachment it is expected to cost only a few cents per attachment.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for metallurgically attaching a tube to a member comprising the steps of:
   a) obtaining a member having a wall, wherein the wall includes opposing first and second sides and includes a partial extrusion extending above the first side, and wherein the partial extrusion has a through hole;
   b) obtaining a tube having an end portion;
   c) after steps a) and b), disposing the tube and the member with the end portion contacting the second side of the wall proximate the partial extrusion; and
   d) after step c), creating a resistance welding current path through the tube and the member proximate the end portion and the partial extrusion and relatively moving the end portion into and deformingly against the partial extrusion creating a weld zone which includes at least some of the end portion and at least some of the partial extrusion.

2. The method of claim 1, wherein the wall is a wall of a plate.

3. The method of claim 1, wherein the wall is a wall of a tubular member.

4. The method of claim 3, wherein the tubular member is a substantially right-circular cylindrical tubular member.

5. The method of claim 1, wherein the partial extrusion has a longitudinal axis aligned substantially perpendicular to the wall, and wherein the through hole is substantially coaxially aligned with the longitudinal axis.

6. The method of claim 1, wherein the tube is a substantially right-circular cylindrical tube.

7. The method of claim 1, wherein the end portion is a tapered end portion.

8. The method of claim 1, wherein the end portion is a flanged end portion.

9. The method of claim 1, wherein step c) includes aligning the tube substantially perpendicular to the wall.

10. The method of claim 1, wherein step d) uses a resistance-welding first electrode contacting the first side of the wall before and substantially at the onset of the partial extrusion and a resistance-welding second electrode contacting the tube, and wherein step d) relatively moves the first and second electrodes to relatively move the end portion into and deformingly against the partial extrusion.

11. The method of claim 10, wherein the second electrode is disposed inside the tube.

12. The method of claim 1, wherein step d) does not melt any of the end portion and does not melt any of the partial extrusion.

13. The method of claim 1, wherein step d) creates an annular weld zone.

14. A method for metallurgically attaching a tube to a member comprising the steps of:
   a) obtaining a member having a wall, wherein the wall includes opposing first and second sides and includes a partial extrusion extending above the first side, wherein the partial extrusion has a through hole and has a longitudinal axis aligned substantially perpendicular to the wall, and wherein the through hole is substantially coaxially aligned with the longitudinal axis;
   b) obtaining a tube having a tapered end portion matching the angle of the partial extrusion;
   c) after steps a) and b), disposing the tube and the member with the tube aligned substantially coaxially with the longitudinal axis and with the tapered end portion contacting the second side of the wall substantially at the partial extrusion; and
   d) after step c), creating an annular resistance welding current path through the tube and the member at the tapered end portion and proximate the partial extrusion and relatively moving the tapered end portion into and deformingly against the partial extrusion creating an annular weld zone which includes at least some of the tapered end portion and at least some of the partial extrusion.

15. The method of claim 14, wherein step d) uses an annular resistance-welding first electrode contacting the first side of the wall before and substantially at the onset of the partial extrusion and uses a cylindrical resistance-welding second electrode disposed inside the tube and contacting the tapered end portion.

16. The method of claim 15, wherein the second electrode has a tapered tip which matches the angle of, and which contacts, the tapered end portion of the tube.

17. The method of claim 16, wherein step d) relatively moves the second electrode substantially parallel to the longitudinal axis and inside the first electrode to relatively move the tapered end portion into and deformingly against the partial extrusion.

18. A method for metallurgically attaching a tube to a member comprising the steps of:
   a) obtaining a member having a wall, wherein the wall includes opposing first and second sides and has a partial extrusion extending above the first side, wherein the partial extrusion has a through hole and has a longitudinal axis aligned substantially perpendicular to the wall, and wherein the through hole is substantially coaxially aligned with the longitudinal axis;
   b) obtaining a tube having a flanged end portion;
   c) after steps a) and b), disposing the tube and the member with the tube aligned substantially coaxially with the longitudinal axis and with the flanged end portion contacting the second side of the wall substantially at the partial extrusion; and
   d) after step c), creating an annular resistance welding current path through the tube and the member at the flanged end portion and proximate the partial extrusion and relatively moving the flanged end portion into and deformingly against the partial extrusion creating an annular weld zone which includes at least some of the flanged end portion and at least some of the partial extrusion.

19. The method of claim 18, wherein step d) uses an annular resistance-welding first electrode contacting the first side of the wall before and substantially at the onset of the partial extrusion and uses an annular resistance-welding second electrode contacting the outside of the tube proximate the flanged end portion.

20. The method of claim 18, wherein step d) uses an annular resistance-welding first electrode contacting the first side of the wall before and substantially at the onset of the partial extrusion and uses a cylindrical resistance-welding second electrode disposed inside the tube.

21. A method for metallurgically attaching a tube to a member comprising the steps of:
   a) obtaining a member having a wall, wherein the wall includes opposing first and second sides and includes a partial extrusion extending above the first side, and wherein the partial extrusion has a through hole;
   b) obtaining a tube having an end portion;
   c) after steps a) and b), disposing the tube and the member with the end portion contacting the second side of the wall proximate the partial extrusion; and
   d) after step c), creating a resistance welding current path through the tube and the member proximate the end portion and the partial extrusion using at least a resistance-welding first electrode contacting the first side of the wall and relatively moving the end portion into and deformingly against the partial extrusion creating a weld zone which includes at least some of the end portion and at least some of the partial extrusion.

22. A method for metallurgically attaching a tube to a member comprising the steps of:
   a) obtaining a member having a wall, wherein the wall includes opposing first and second sides and has a partial extrusion extending above the first side, wherein the partial extrusion has a through hole and has a longitudinal axis aligned substantially perpendicular to the wall, and wherein the through hole is substantially coaxially aligned with the longitudinal axis;

b) obtaining a tube having a flanged end portion;

c) after steps a) and b), disposing the tube and the member with the tube aligned substantially coaxially with the longitudinal axis and with the flanged end portion contacting the second side of the wall substantially at the partial extrusion; and d) after step c), creating an annular resistance welding current path through the tube and the member at the flanged end portion and proximate the partial extrusion using at least a resistance-welding first electrode contacting the first side of the wall and relatively moving the flanged end portion into and deformingly against the partial extrusion creating an annular weld zone which includes at least some of the flanged end portion and at least some of the partial extrusion.

\* \* \* \* \*